(12) United States Patent
Kamoda et al.

(10) Patent No.: US 11,458,676 B2
(45) Date of Patent: Oct. 4, 2022

(54) RESIN POWDER AND METHOD OF MANUFACTURING SOLID FREEFORM FABRICATION OBJECT

(71) Applicant: RICOH COMPANY, LTD., Tokyo (JP)

(72) Inventors: Kiichi Kamoda, Kanagawa (JP); Akira Saito, Kanagawa (JP); Yasutomo Aman, Kanagawa (JP); Hitoshi Iwatsuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 386 days.

(21) Appl. No.: 16/563,590

(22) Filed: Sep. 6, 2019

(65) Prior Publication Data

US 2020/0114574 A1    Apr. 16, 2020

(30) Foreign Application Priority Data

Sep. 7, 2018  (JP) .............................. JP2018-167696
Aug. 30, 2019  (JP) .............................. JP2019-158102
Sep. 5, 2019  (JP) .............................. JP2019-162395

(51) Int. Cl.
*B29C 64/153* (2017.01)
*B33Y 70/00* (2020.01)
*B33Y 10/00* (2015.01)
*B29K 101/12* (2006.01)
*B29K 105/00* (2006.01)

(52) U.S. Cl.
CPC ............ *B29C 64/153* (2017.08); *B33Y 70/00* (2014.12); *B29K 2101/12* (2013.01); *B29K 2105/251* (2013.01); *B33Y 10/00* (2014.12)

(58) Field of Classification Search
None
See application file for complete search history.

(56) References Cited

U.S. PATENT DOCUMENTS

| | | |
|---|---|---|
| 6,531,086 B1 | 3/2003 | Larsson |
| 7,794,647 B1 | 9/2010 | Deckard |
| 8,652,278 B2 | 2/2014 | Fruth et al. |
| 2011/0143108 A1 | 6/2011 | Fruth et al. |
| 2016/0177122 A1 | 6/2016 | Naruse et al. |
| 2016/0271877 A1 | 9/2016 | Suzuki et al. |

(Continued)

FOREIGN PATENT DOCUMENTS

| | | |
|---|---|---|
| EP | 3 482 901 A1 | 5/2019 |
| JP | 11-254542 | 9/1999 |

(Continued)

OTHER PUBLICATIONS

Partial European Search Report dated Feb. 10, 2020, in Patent Application No. 19195836.2, citing documents AA and AO therein, 13 pages.

*Primary Examiner* — Ronak C Patel
(74) *Attorney, Agent, or Firm* — Grüneberg and Myers PLLC (57) ABSTRACT

A resin powder contains a resin contains columnar particles, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

7 Claims, 4 Drawing Sheets

(56) References Cited

U.S. PATENT DOCUMENTS

| | | | |
|---|---|---|---|
| 2016/0271879 A1 | 9/2016 | Yamashita et al. | |
| 2017/0189960 A1* | 7/2017 | Ibe | B22F 1/052 |
| 2017/0209927 A1 | 7/2017 | Yamashita et al. | |
| 2017/0217087 A1 | 8/2017 | Tamoto et al. | |
| 2017/0225404 A1 | 8/2017 | Naruse et al. | |
| 2018/0001520 A1 | 1/2018 | Saito et al. | |
| 2018/0022024 A1 | 1/2018 | Saito et al. | |
| 2018/0023219 A1 | 1/2018 | Saito et al. | |
| 2018/0147780 A1 | 5/2018 | Kamoda et al. | |
| 2018/0264720 A1 | 9/2018 | Tamoto et al. | |
| 2018/0264721 A1* | 9/2018 | Iida | B29C 64/264 |
| 2018/0273756 A1 | 9/2018 | Saito et al. | |
| 2018/0355144 A1* | 12/2018 | Saito | C08L 71/00 |
| 2019/0126538 A1 | 5/2019 | Fujita et al. | |
| 2019/0241734 A1* | 8/2019 | Naruse | B29B 9/12 |

FOREIGN PATENT DOCUMENTS

| | | |
|---|---|---|
| JP | 2018-015972 | 2/2018 |
| JP | 2018-086757 | 6/2018 |
| JP | 2018-111304 | 7/2018 |
| JP | 2018-149800 | 9/2018 |
| JP | 2018-154093 | 10/2018 |
| JP | 2018-154116 | 10/2018 |
| JP | 2018-158571 | 10/2018 |
| JP | 2019-001154 | 1/2019 |
| JP | 2019-119162 | 7/2019 |
| JP | 2019-135092 | 8/2019 |
| JP | 2019-147291 | 9/2019 |
| WO | WO2017/112723 A1 | 6/2017 |

* cited by examiner

RESIN POWDER AND METHOD OF MANUFACTURING SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2018-167696, 2019-158102, and 2019-162395, filed on Sep. 7, 2018, Aug. 30, 2019, and Sep. 5, 2019, respectively, in the Japan Patent Office, the entire disclosures of which are hereby incorporated by reference herein.

BACKGROUND

Technical Field

The present invention relates to a resin powder and a method of manufacturing a solid freeform fabrication object.

Description of the Related Art

Technologies using powder material having a columnar form for solid freeform fabrication have been proposed.

SUMMARY

According to embodiments of the present disclosure, provided is a resin powder which contains a resin contains columnar particles, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a resin powder can be provided which reduces the surface of a solid freeform fabrication object and enhances mechanical strength of the solid freeform fabrication object.

Resin Powder

The resin powder in a first embodiment of the present disclosure contains a resin containing columnar particles and other optional components, wherein the proportion of the columnar particles having a ratio (L/W) of less than 1 is 50 percent by volume or more in the total volume of the resin powder, where W represents the width along the radial direction of the columnar particles and L represents the length along the axis of the columnar particles.

The resin powder in a second embodiment of the present disclosure contains a resin containing particles containing columnar particles and other optional components, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

The resin powder in the first embodiment and the second embodiment of the present disclosure is manufactured based on the knowledge that, conventionally, the surface roughness of a solid freeform fabrication object becomes coarse and accordingly the strength of the solid freeform fabrication object may decrease in comparison with a molded product. In the present disclosure, the columnar particle includes columnar fiber.

Resin Powder of First Embodiment

The resin powder of the first embodiment contains a resin containing columnar particles and the proportion of the columnar particles having a ratio (L/W) of less than 1, where W represents the width in the radial direction of the columnar particles and L represents the length in the axis of the columnar particles, is 50 percent by volume or more in the total volume of the resin powder, preferably 52 percent by volume or more, more preferably 55 percent by volume or more, furthermore preferably 60 percent by volume or more, by far furthermore preferably 65 percent by volume or more, particularly preferably 70 percent by volume or more, more particularly preferably 73 percent by volume or more, furthermore particularly preferably 75 percent by volume or more, by far furthermore particularly preferably 80 percent by volume or more, and most preferably 84 percent by volume or more.

The upper limit is not particularly limited and can be suitably selected to suit to a particular application. It is preferably from 95 percent by volume or less.

In the resin powder of the first embodiment, when the proportion of the columnar particles having a ratio (L/W) of less than 1 is 50 percent or more in the total volume of the resin powder, it is possible to reduce the amount of long columnar particles adhering to the surface of a solid freeform fabrication object, which leads to a decrease in the surface roughness of the solid freeform fabrication object. Moreover, the decrease in the surface roughness of the solid freeform fabrication object leads to the existing ratio of surface deficiency of the solid freeform fabrication object, which increases the strength as a consequence. The decrease in the surface roughness and the enhancement of the strength of a solid freeform fabrication object is further demonstrated when particles having a small ratio (L/W) are used, the resin powder has a large average circularity, and the particle size distribution of the resin powder is sharp (particles are close to uniform).

The average of the width W in the radial direction of the columnar particles is preferably 250 μm or less, more preferably 200 μm or less, furthermore preferably 150 μm or less, by far furthermore preferably 145 μm or less, particularly preferably 140 μm or less, more particularly preferably 100 μm or less, and furthermore particularly preferably 70 μm or less. In addition, the average of the width W in the radial direction of the columnar particles is preferably 5 μm or more, more preferably 30 μm or more, furthermore preferably 32 μm or more, and particularly preferably 50 μm or more, The average of the length L in the axis direction L of the columnar particles is preferably 5 μm or less, more preferably 9 μm or less, furthermore preferably 10 μm or less, by far furthermore preferably 20 μm or less, particularly preferably 25 μm or less, more particularly preferably 30 μm or less, and furthermore particularly preferably 45 μm or less. The average of the length L in the axis direction of the columnar particles is preferably 250 μm or less, more preferably 240 μm or less, furthermore preferably 200 μm or less, by far furthermore preferably 150 μm or less, particularly preferably 110 μm or less, and more particularly preferably 100 μm or less.

The width W in the radial direction of the columnar particles and the length L in the axis direction of the columnar particles can be observed and measured by, for example, a scanning electron microscope (SEM) (S4200, manufactured by Hitachi, Ltd.). The width W and the length L of multiple particles are measured to obtain the average of the width W in the radial direction of the columnar particle and the average of the length L in the axis direction of the columnar particle. The number of the multiple particles to be measured is preferably 10, more preferably 100, and furthermore preferably 1,000.

Figure 3:
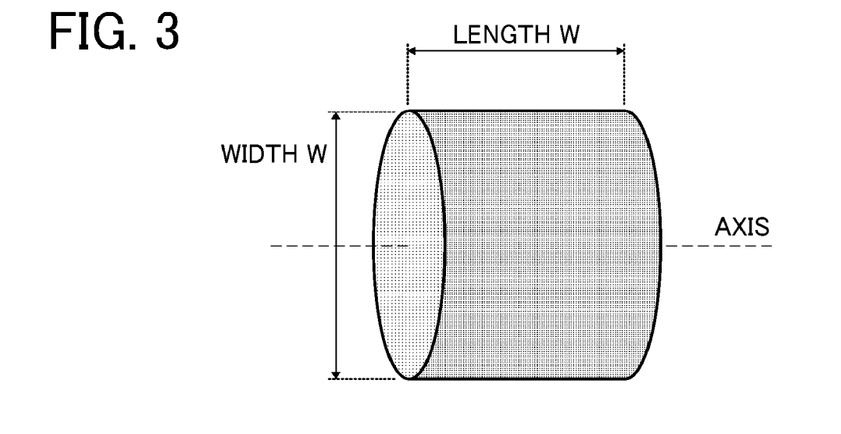
FIG. 3 is a diagram illustrating the width W in the radial direction of a particle and the length L in the axis direction of the particle.

FIG. 3 is a schematic diagram illustrating the columnar form and W represents the width in the radial direction of the particle and L represents the length in the axis direction of the particle.

The columnar particle is not particularly limited as long as the cross section thereof is columnar and can be suitably selected to suit to a particular application. Examples are significantly cylindrical form and cuboid. Due to the columnar form, particles can be packed without a space so that the strength of an obtained solid freeform fabrication object can be enhanced.

The columnar particle preferably has sides facing each other. The sides facing each other may have an incline. However, they are preferable when they are parallel to each other without an incline in terms of productivity and stability of laser fabrication.

The form of the columnar particle can be observed and distinguished by, for example, a scanning electron microscope (S4200, manufactured by Hitachi Ltd.), a wet process particle size and form analyzer (flow particle image analyzer, FPIA-3000, manufactured by Sysmex Corporation), etc.

The average circularity of the resin powder of the first embodiment is preferably 0.70 or more, more preferably 0.72 or more, furthermore preferably 0.75 or more, by far furthermore preferably 0.80 or more, particularly preferably 0.81 or more, more particularly preferably 0.83 or more, and most preferably from 0.85 to 1.00.

The average circularity is an index for the degree of circularity and the average circularity of 1 means true circle. The circularity is obtained by the following relationship, where S represents an area (number of pixels) and L represents a perimeter.

$$\text{Circularity} = 4\pi S/L^2$$

The average circularity can be measured by a wet-process flow type particle size/form analyzer (FPIA-3000, manufactured by SYSMEX CORPORATION), etc. This device takes particle images at high speed in a liquid suspension flowing in a glass cell by a charge-coupled device (CCD) and analyzes individual particle images in real time. This kind of device is suitable to obtain the average circularity. The number of measuring counts of the particles is not particularly limited and preferably 1,000 or greater and more preferably 3,000 or greater.

The 50 percent cumulative volume particle diameter ($D_{50}$) of the resin powder is preferably 5 μm or more, more preferably 6 μm or more, furthermore preferably 10 μm or more, by far furthermore preferably 15 μm or more, particularly preferably 20 μm or more, more particularly preferably 25 μm or more, furthermore particularly preferably 29 μm or more, by far furthermore particularly preferably 50 μm or more, most preferably 60 μm or more, particularly most preferably 70 μm or more, and more particularly most preferably 80 μm or more.

The 50 percent cumulative volume particle diameter ($D_{50}$) of the resin powder is preferably 100 μm or less, more preferably 105 μm or less, furthermore preferably 110 μm or less, by far furthermore preferably 115 μm or less, by far more furthermore preferably 120 μm or less, particularly preferably 122 μm or less, more particularly preferably 125 μm or less, furthermore particularly preferably 130 μm or less, by far furthermore particularly preferably 172 μm or less, most preferably 190 μm or less, particularly most preferably 200 μm or less, and firstly most preferably 250 μm or less.

Specifically, the ratio (Mv/Mn) of the mean volume diameter/the mean number diameter is preferably 1.20 or more, more preferably 1.30 or more, and particularly preferably 1.90 or more. In addition, Mv/Mn is preferably 2.00 or less, more preferably 2.10 or less, furthermore preferably 2.20 or less, particularly preferably 2.40 or less, and most preferably 2.50 or less.

The 50 percent cumulative volume particle diameter can be measured by, for example, a particle size distribution measuring device (microtrac MT3300 EXII, manufactured by MicrotracBEL Corp).

The mean number diameter Mv/the mean number diameter Mn can be measured and calculated by using, for example, an imaging and wet process particle size and form analyzer (flow particle image analyzer, FPIA-3000, manufactured by Sysmex Corporation).

Resin

The resin powder preferably contains a thermoplastic resin as the resin.

In general, thermoplastic resins have plasticity and are softened when heated and solidified when cooled.

The thermoplastic resin preferably has a melting point of 100 degrees C. or higher as measured according to ISO 3146 regulation. It is preferable that the melting point of the resin powder as measured according to ISO 3146 regulation be 100 degrees C. or higher because it is within the heat resistance temperature range.

The melting point can be measured according to ISO 3146 regulation (plastic transition temperature measuring method, JIS K7121 format) using a differential scanning calorimeter (DSC). When a plurality of melting points exist, the melting point on the higher temperature side is used.

The thermoplastic resin has no particular limit and can be suitably selected to suit to a particular application. Specific examples include, but are not limited to, polyolefin, polyamide, polyester, polyther, polyarylketone, a liquid crystal polymer (LCP), polyacetal (POM), polyimide, a fluorochemical resin, and polyphenylene sulfide. These can be used alone or in combination. Of these, polyolefin, polyamide, polyester, and polyether are preferable.

Specific examples of the polyolefine include, but are not limited to, polyethylene (PE) and polypropylene (PP). These can be used alone or in combination.

Specific examples of the polyamide include, but are not limited to, polyamide 410 (PA410), polyamide 6 (PA6), polyamide 66 (PA66), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T), and polyamide 10T (PA10T). These can be used alone or in combination.

Of these, PA9T is also referred to as polynonane methylene terephthal amide and constituted of a diamine having 9 carbon atoms and a terephthalic acid. In general, since the carbon acid side is an aromatic series, PA9T is referred to as semi-aromatic series. Moreover, as a whole aromatic series in which both carboxylic acid side and diamine side are aromatic, aramid constituted from p-phenylenediamine and a terephathalic acid is also included as polyamides.

Specific examples of the polyester include, but are not limited to, polyethyleneterephthalate (PET), polybutylene terephthalate (PBT), and polylactic acid (PLA). To impart heat resistance, polyester including aromatic series partially including terephthalic acid and isophthalic acid is also suitably used.

Specific examples of the polyether include, but are not limited to, polyether etherketone (PEEK), polyetherketone (PEK), polyether ketone ketone (PEKK), polyaryl ether ketone (PAEK), polyether ether ketone ketone (PEEKK), and polyether keone ether ketone ketone (PEKEKK). These can be used alone or in combination.

The thermoplastic resin is preferably a crystalline resin. The crystalline resin has a melting peak as measured according to ISO 3146 regulation (plastic transition temperature measuring method, JIS K7121 format).

Specific examples of the crystalline resin include, but are not limited to, polybutylene terephthalate (PBT), polyether etherketone (PEEK), and polyamide 12 (PA12). These can be used alone or in combination.

Of these, a crystal-controlled crystalline thermoplastic resin is preferable. Such a crystalline thermoplastic resin having a crystal size and a controlled crystal alignment can be obtained by a method of applying external stimuli such as heat, drawing, crystal nuclear material, and ultrasonic treatment.

Additive

The resin powder may contain an additive in addition to the resin.

Such an additive is not particularly limited and can be suitably selected to suit to a particular application. For example, an antioxidant, a flame retardant, an inorganic reinforcing agent, a fluidizer, a plasticizer, a crystal nucleating agent, etc. can be added.

The additive may be mixed with the thermoplastic resin before or after the resin is powdered.

The proportion of the additive (total amount of the additives if the resin powder contains two or more types of the additives) in the total amount of the resin powder is preferably not greater than 3.00 percent by mass, more preferably from 0.05 to 3.00 percent by mass, and furthermore preferably from 0.10 to 1.50 percent by mass.

Such an antioxidant is not particularly limited, can be suitably selected to suit to a particular application, and includes a so-called deterioration inhibitor and stabilizer. Examples include, but are not limited to, hydrazide-based compounds and amide-based compound, which are metal deactivators, phenol-based compounds (hindered phenol-based compounds) and amine-based compounds, which are radical scavengers, phosphate-based compounds and sulfur-based compounds, which are peroxide decomposers, and triazine-based compounds, which are ultraviolet light absorbers. These can be used alone or in combination. Of these, a combination of a radical scavenger and a peroxide decomposer is preferable in terms of the antioxidant effect.

Examples of the flame retardant include, but are not limited to, a halogen-based retardant, a phosphorine-based retardant, an inorganic hydrated metal compound-based retardant, a nitrogen-containing retardant, and a silicone-based retardant and an inorganic reinforcing agent. These can be used alone or in combination. If two or more flame retardants are used in combination, the combination of a halogen-based retardant and an inorganic hydrated metal compound-based flame retardant is preferable to enhance flame retardancy.

Flame retardancy of resin powder can be evaluated by, for example, JIS K6911 format, JIS L1091 format (ISO 6925 regulation), JIS C3005 format, and a pyrogen test (using a cone calorimeter).

The proportion of the flame retardant in the total amount of the resin powder is preferably from 1 to 50 percent by mass and more preferably from 10 to 30 percent by mass to further enhance flame retardancy. When the proportion is within the above-specified range, flame retardancy is sufficient.

As the inorganic reinforcing agent, for example, inorganic fibrous materials such as glass fiber, carbon fiber, and aramid fiber and inorganic laminar silicates such as talc, mica, and montmorillonite are usable. Addition of an inorganic reinforcing agent contributes to enhancing flame retardancy. It is also preferable in terms of striking a balance between strengthening physical property and flame retardancy.

The fluidizer partially or entirely covers the surface of the resin powder to improve flowability of the resin powder. If flowability of the resin powder increases, surface smoothness of the powder layer during recoating increases. In addition, voids in the resin powder are reduced, which makes it possible to further improve surface property, dimension accuracy, and strength of a solid freeform fabrication object. It is preferable that such a fluidizer cover the surface of the resin powder. However, the fluidizer may be partially embedded in the resin powder.

The average primary particle diameter of the fluidizer is preferably 500 nm or less and more preferably 50 nm or less. When the average primary particle diameter is in this range, the covering ratio of the surface of the resin powder by fluidizer can be increased so that voids can be reduced in addition to the enhancement of flowability.

There is no specific limit to the fluidizer and it can be suitably selected to suit to a particular application. For example, spherical inorganic particles are preferable and a metal oxide is more preferable.

Specific examples of the fluidizer include, but are not limited to, silica, alumina, titania, zinc oxide, magnesium oxide, tin oxide, iron oxide, and copper oxide. These can be used alone or in combination. Of these, silica and titania are preferable.

The fluidizer having a hydrophobized surface is preferably used. The hydrophobizing agent for use in hydrophobizing treatment is not particularly limited and can be suitably selected to suit to a particular application. Specific examples include, but are not limited to, silane coupling agents such as hexamethyl disilazane (HMDS) and dimethyldichlorosilane (DMDS) and silicone oil treating agent such as dimethyl silicone oil and amino-modified silicone oil. Of these, silane coupling agents are preferable.

The processing amount of the hydrophobizing agent is preferably from 2 to 6 mg/m$^2$ per surface area of the resin powder.

The proportion of the fluidizer in the resin powder is preferably from 0.05 to 3.00 percent by mass and more preferably from 0.10 to 1.50 percent by mass. When the proportion is within the range specified above, flowability of the resin powder can be improved and at the same time the impact of reduction of filling density ascribable to an increase of voids can be minimized, which is preferable.

A known powder mixer is used in the mixing and coating processes of the fluidizer with the resin powder. A mixer equipped with a jacket, etc. is preferably used to control the temperature of the inside of the mixer. In addition, it is possible to arbitrarily change the rotational frequency, speed, time, temperatures, etc. of the powder mixer.

Specific examples of the powder mixer include, but are not limited to, a V-type mixer, a Henschel mixer, a Rocking mixer, a Nautor mixer, and a Super mixer.

Resin Powder of Second Embodiment

The resin powder of the second embodiment contains resin containing particles containing columnar particles and wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

It is preferable that the columnar particles have a ratio (L/W) of from 1 to less than 5.0 and the proportion of the particles having a ratio (L/W) of 1.0 or more is from 1 to less than 50 percent by volume in the total volume of the resin powder. It is more preferable that the columnar particles have a ratio (L/W) of from 1 to less than 3.0 and the proportion of the particles having a ratio (L/W) of 1.0 or more is from 10 to less than 50 percent by volume in the total volume of the resin powder. When the columnar particles have a ratio (L/W) of from 1 to less than 2.0, the proportion of the particles having a ratio (L/W) of 1.0 or more is furthermore preferably 30 percent by volume or more, by far furthermore preferably 38 percent by volume or more, particularly preferably 40 percent or more, more particularly preferably 45 percent by volume or more, and most preferably 48 percent by volume or more. In addition, the proportion of the particle having a ratio (L/W) of 1 or greater is preferably less than 50 percent by volume or less.

When the columnar particles have a ratio (L/W) of from 1 to less than 5.0 and the proportion of the particles having a ratio (L/W) of 1.0 or more is less than 50 percent by volume in the total volume of the resin powder and if large particles having a ratio (L/W) of 1 or more are present, it is advantageous to reduce the surface roughness of a solid freeform fabrication object and enhance the strength thereof because its proportion is low. Furthermore, if long particles are present, particles having a form other than the columnar forms granulated by a pulverization method or a chemical polymerization method can be mixed to diminish the demerit of the long particle.

The width W in the radial direction of the columnar particle and the length in the axis direction of the columnar particle can be measured in the same manner as for the resin powder of the first embodiment.

Specifically, the average circularity of the resin powder of the second embodiment is preferably 0.39 or more, more preferably 0.40 or more, furthermore preferably 0.41 or more, more furthermore preferably 0.42 or more, particularly preferably 0.45 or more, more particularly preferably 0.50 or more, furthermore particularly 0.51 or more, most preferably 0.55 or more, more most preferably 0.58 or more, furthermore most preferably 0.60 or more, particularly most preferably 0.61 or more, best and most preferably 0.65 or more, more best and most preferably 0.66 or more, and furthermore best and most preferably 0.70 or more, and by far furthermore best and most preferably from 0.70 to 1.00.

The average circularity of the resin powder of the second embodiment can be measured in the same manner as for the resin powder of the first embodiment.

Since the form, resin, additives, etc., in the resin powder of the second embodiment are the same as those for the first embodiment, the description thereof is omitted.

Method of Manufacturing Resin Powder of First Embodiment and Second Embodiment

The columnar particle contained in the resin powder of the first embodiment and the second embodiment can be obtained by a method in which fiber having a significantly cylindrical form is prepared and thereafter cut to directly obtain the significantly cylindrical form. Alternatively, it can be obtained by preparing a cubic form from film-like form followed by post-processing.

How to prepare fiber is, for example, using an extruder, drawing a melted resin into a fibrous form during stirring at temperatures 30 degrees C. or greater higher than the melting point. It is preferable to draw the melted resin to about 1/1 to about 1/10 to obtain the fiber. The form of the base of the columnar form particle is determined by the form of the nozzle orifice of an extruder. For example, if the form of the base, i.e., the cross section of fiber, is circular, a nozzle having a circular orifice is used. For a polygonal columnar form, the nozzle orifice is selected in accordance with the form.

It is preferable that the dimension accuracy of fiber be higher. The circular form of a surface portion is at least 10 percent or less at radius. In addition, it is preferable to have more nozzle orifices to enhance productivity.

For the cutting, a cutting machine employing a guillotine method in which both the upper edge and the lower edge are blades or a cutting machine employing a straw cutter method of cutting with an upper edge and not a blade but a board placed on the bottom side can be used. The fiber can be directly cut to 0.005 to 0.2 mm by such a cutting device. Alternatively, it is possible to use $CO_2$ laser, etc. for cutting.

The resin powder is preferably composed of columnar particles. Also, it may be combined with particles having another form or fiber. It is more preferable that the proportion of the columnar form in the resin powder be 50 percent by mass or more to increase the density.

Figure 4:
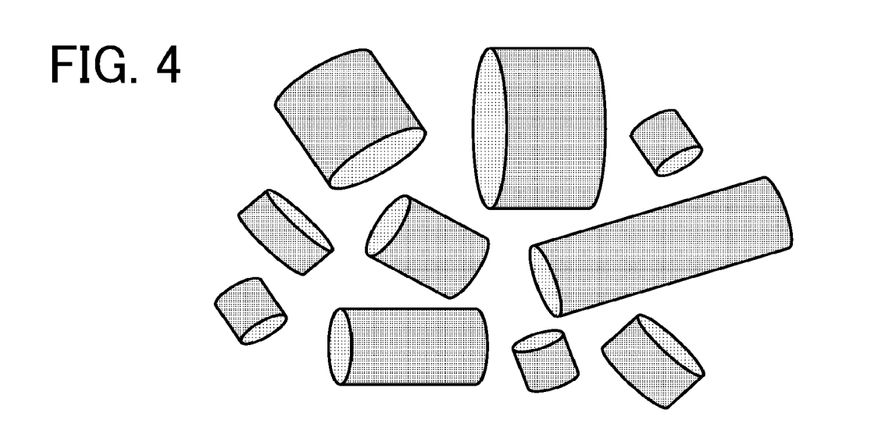
FIG. 4 is a schematic diagram illustrating resin powder containing columnar particles according to an embodiment of the present disclosure.
Figure 5:
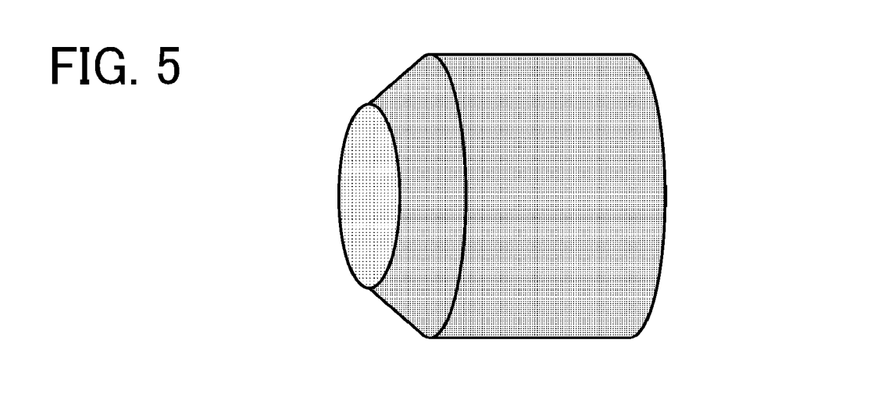
FIG. 5 is a schematic diagram illustrating an example of the columnar particle according to an embodiment of the present disclosure.

FIG. 4 is a schematic diagram illustrating resin powder containing columnar particles in the present disclosure. Due to spherodization, etc., of the resin powder, it is possible to chamfer, round, etc., the corners of the columnar particles as illustrated in FIG. 5. Due to such processing, flowability of the powder is enhanced, so that the surface roughness of a solid freeform fabrication object is improved.

To make the columnar particle in the resin powder pointless, any method of rounding points of the columnar particles can be used. For example, it is possible to employ mechanical pulverization utilizing high speed rotation or high speed impact or spheroidizing due to surface melting by mechanical abrasion.

Application of Resin Powder

The resin powder of the first embodiment and the second embodiment is suitably used in various methods of manufacturing a solid freeform fabrication object using resin powder such as the SLS method, the SMS method, the multi jet fusion (MJF) method, or the binder jetting (BJ) method.

The resin powder of the first embodiment and the second embodiment of the present disclosure can be suitably applied to surface modifying agents, spacers, lubricants, paints, grind stone, additives, secondary battery separator, foods, cosmetics, and cloths in addition to solid freeform fabrication. In addition, it can be used as material or metal substitution material for use in fields such as auto mobiles, precision devices, semiconductor, aerospace, and medicines.

Method of Manufacturing Solid Freeform Fabrication Object and Device for Manufacturing Solid Freeform Fabrication Object The method of manufacturing a solid freeform fabrication object in the first embodiment includes forming a layer of a resin powder containing a resin containing columnar particles, melting the layer with irradiation of electromagnetic wave, cooling down the layer to cure the layer, repeating the forming, melting, cooling to laminate the layer, and other optional processes, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

The method of manufacturing a solid freeform fabrication object in the second embodiment includes forming a layer of a resin powder containing a resin containing particles containing columnar particles, melting the layer with irradiation of electromagnetic wave, cooling down the layer to cure the layer, repeating the forming, the melting, the cooling to laminate the layer, and other optional processes, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

The device for manufacturing a solid freeform fabrication object in the first embodiment includes a supply tank configured to accommodate a resin powder containing a resin containing columnar particles, a layer forming device configured to form a layer of the resin powder, a powder attaching device configured to attach the resin powder in a selected region in the layer to each other, and other optional devices, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

The device for manufacturing a solid freeform fabrication object in the second embodiment includes a supply tank configured to accommodate a resin powder containing a resin containing particles containing columnar particles, a layer forming device configured to form a layer of the resin powder, a powder attaching device configured to attach the resin powder in a selected region in the layer to each other, and other optional devices, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

The method of manufacturing a solid freeform fabrication object of the present disclosure can be suitably executed by the device for manufacturing a solid freeform fabrication object of the present disclosure.

As the resin powder, the same resin powder as that of the first embodiment or the second embodiment of the present disclosure can be used.

Examples of the electromagnetic wave generator for use in electromagnetic wave irradiation are $CO_2$ laser, infrared irradiation source, microwave generators, radiant heaters, LED lamps, and combinations thereof are usable.

Figure 1:
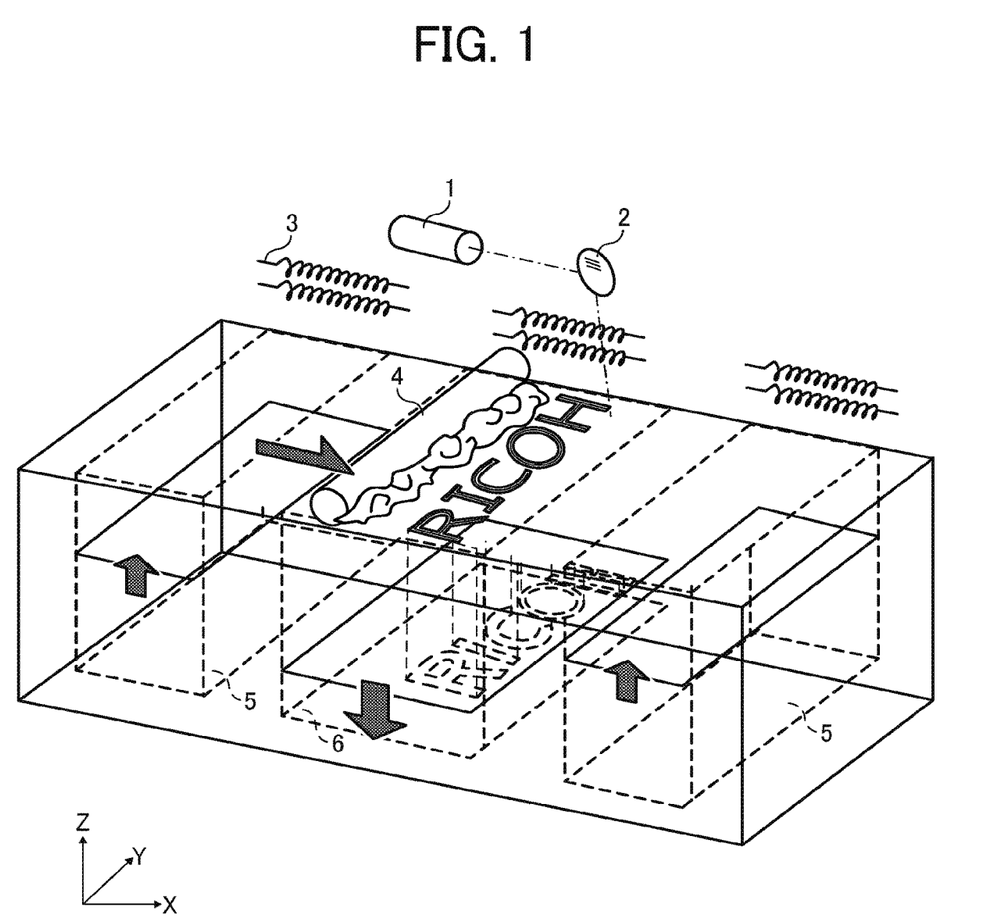
FIG. 1 is a schematic diagram illustrating an example of the device for manufacturing a solid freeform fabrication object for use in the method of manufacturing a solid freeform fabrication object according to an embodiment of the present disclosure.

An example of the device for manufacturing a solid freeform fabrication object of the present disclosure is described with reference to FIG. 1. The device for manufacturing a solid freeform fabrication object illustrated in FIG. 1 stores powder in a supply tank 5 for powder and supplies the powder to a laser beam scanning space 6 using a roller 4 in proportion to the usage amount. It is preferable that the temperature of the supply tank 5 be controlled by a heater 3. The laser beam scanning space 6 is irradiated with the laser beams emitted from an electromagnetic irradiation source 1 using a reflection mirror 2. The powder is sintered with the heat of the laser beams to obtain a solid freeform fabrication object.

The temperature of the supply tank 5 is preferably 10 degrees C. or more lower than the melting point of the resin powder.

The temperature of the part bed in the laser beam scanning space 6 is preferably 5 degrees C. or more lower than the melting point of the powder.

The power of the laser has no particular limit and can be suitably selected to suit to a particular application. For example, it is preferably from 10 to 150 W.

In another embodiment, solid freeform fabrication objects in the present disclosure can be manufactured using selective mask sintering (SMS) technologies. The SMS process suitably usable is described in, for example, the specification of U.S. Pat. No. 6,531,086.

In the SMS process, powder layers are partially and selectively irradiated with infrared, which is selectively shielded using a shielding mask. When utilizing the SMS process to manufacture a solid freeform fabrication object from the resin powder of the present disclosure, it is possible and preferable to contain material to enhance infrared absorption of the resin powder. For example, the resin powder may contain at least one type of heat absorbent and/or dark color material (such as carbon fiber, carbon black, carbon nanotube, and cellulose nanofiber).

In yet another embodiment, using the resin powder of the first embodiment or the second embodiment of the present disclosure, a solid freeform fabrication object can be manufactured by the device for manufacturing a solid freeform fabrication object employing the binder jetting mentioned above. The method of manufacturing a solid freeform fabrication object includes a layer forming process to form a layer containing the resin powder of the present disclosure and a powder adhesion process to discharge liquid to a selected area of the layer followed by drying to attach the resin powder to each other, and repeating the layer forming process and the powder adhesion process, and may furthermore optionally include other processes.

The device for manufacturing a solid freeform fabrication object includes a supply tank, a layer forming device to form a layer including the resin powder of the first embodiment or the second embodiment of the present disclosure, and a liquid discharging device to discharge liquid to a selected area of the layer and may furthermore optionally include other devices. As the discharging device to discharge liquid, it is preferable to employ an inkjet method in terms of dimension accuracy and fabrication performance of a solid freeform fabrication object to be obtained.

FIG. 2 (FIG. 2A to FIG. 2F) is a schematic diagram illustrating an example of the process of the binder jetting method. The device for manufacturing a solid freeform fabrication object illustrated in FIGS. 2A to 2F includes a powder storage tank 11 for fabrication and a powder storage tank 12 for supplying. Each of these powder storage tanks 11 and 12 has a stage 13 movable up and down and places the resin powder on the stage 13 to form a layer formed of the resin powder. A fabrication liquid supplying device 15 is disposed over the powder storage tank 11 for fabrication to discharge a liquid material 16 for solid freeform fabrication toward the resin powder in the powder storage tank 11. Furthermore, the device for manufacturing a solid freeform fabrication includes a resin powder layer forming device 14 (hereinafter also referred to as recoater) capable of supplying the resin powder from the powder storage tank 12 for supplying to the powder storage tank 11 for fabrication and smoothing the surface of the resin powder layer in the powder storage tank 11 for fabrication.

Figure 2A:
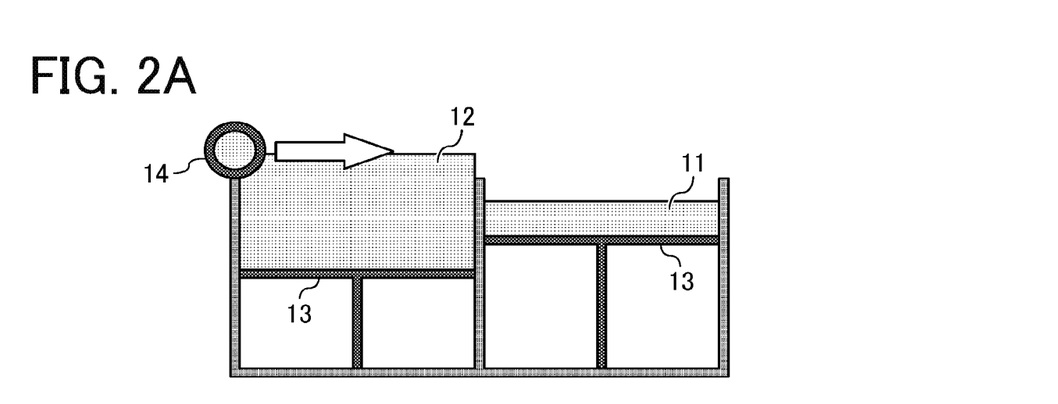
FIG. 2A is a schematic diagram illustrating an example of the process of forming a powder layer having a smooth surface in the method of manufacturing a solid freeform fabrication object according to an embodiment of the present disclosure.
Figure 2B:
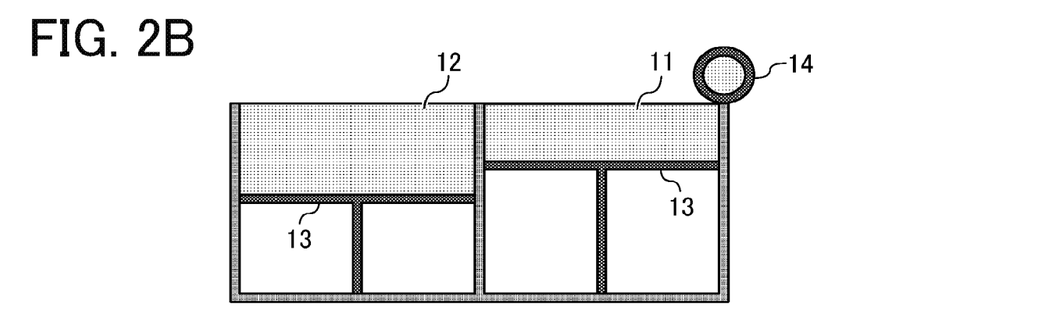
FIG. 2B is a schematic diagram illustrating an example of the process of forming a powder layer having a smooth surface in the method of manufacturing a solid freeform fabrication object according to an embodiment of the present disclosure.

FIGS. 2A and 2B are diagrams illustrating the step of supplying the resin powder from the powder storage tank 12 for supplying to the powder storage tank 11 for fabrication and the step of forming the resin powder layer having a smooth surface. Each stage 13 of the powder storage tank 11 for fabrication and the powder storage tank 12 for supplying is controlled to adjust the gap therebetween to obtain a desired layer thickness. Thereafter, the resin powder layer forming device 14 is moved from the powder storage tank 12 for supplying to the powder storage tank 11 for fabrication to form a resin powder layer in the powder storage tank 11 for fabrication.

Figure 2C:
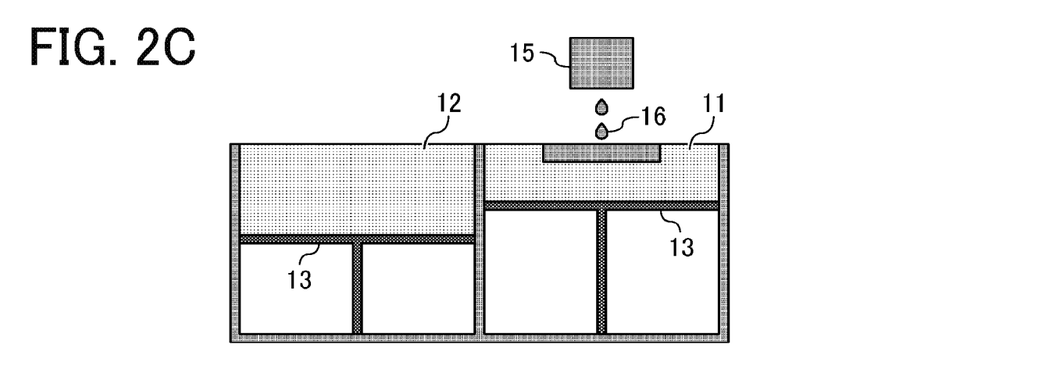
FIG. 2C is a schematic diagram illustrating an example of the process of dripping a liquid material for solid freeform fabrication in the method of manufacturing a solid freeform fabrication object according to an embodiment of the present disclosure.

FIG. 2C is a diagram illustrating the process of dripping the liquid material 16 for solid freeform fabrication onto the resin powder layer in the powder storage tank 11 for fabrication by using the fabrication liquid supplying device 15. At this point, the position where the liquid material 16 for solid freeform fabrication is dripped on the resin powder layer is set based on two-dimensional image data (slice data) obtained by slicing the solid freeform fabrication object into multiple plane layers.

Figure 2D:
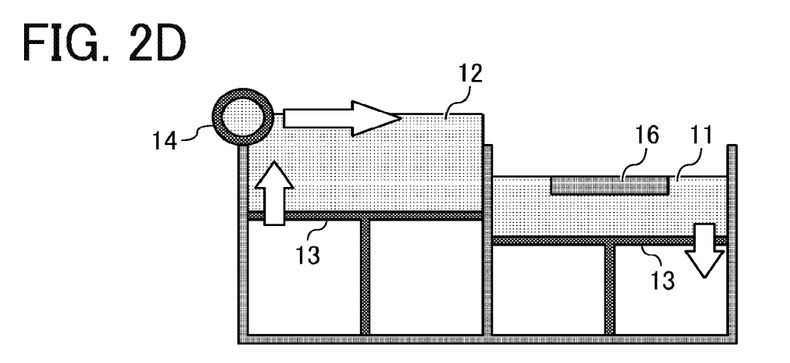
FIG. 2D is a schematic diagram illustrating an example of the process of newly forming a resin powder layer in a powder storage tank for fabrication in the method of manufacturing a solid freeform fabrication object according to an embodiment of the present disclosure.
Figure 2E:
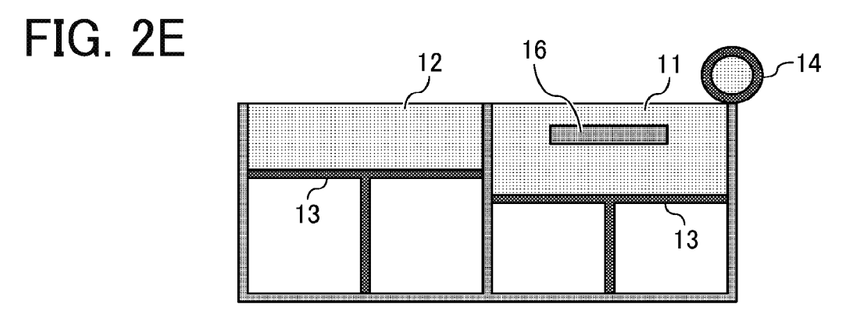
FIG. 2E is a schematic diagram illustrating another example of the process of newly forming a resin powder layer in a powder storage tank for fabrication in the method of manufacturing a solid freeform fabrication object according to an embodiment of the present disclosure.

In FIGS. 2D and 2E, the stage 13 of the powder storage tank 12 for supplying is elevated and the stage 13 of the powder storage tank 11 for fabrication is lowered while controlling the gap therebetween to obtain a desired thickness. Thereafter, the resin powder layer forming device 14 is moved again from the powder storage tank 12 for supplying to the powder storage tank 11 for fabrication. As a result, a new resin powder layer is formed in the powder storage tank 11 for solid freeform fabrication.

Figure 2F:
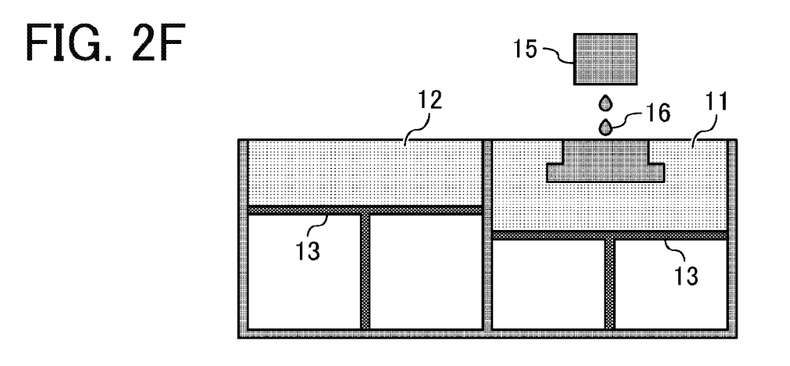
FIG. 2F is a schematic diagram illustrating an example of the process of dripping a liquid material again for solid freeform fabrication in the method of manufacturing a solid freeform fabrication object according to an embodiment of the present disclosure.

FIG. 2F is a diagram illustrating the process of dripping the liquid material 16 for solid freeform fabrication again onto the resin powder layer in the powder storage tank 11 for fabrication by using the fabrication liquid supplying device 15. This series of processes is repeated. Subsequent to optional drying, the resin powder to which no liquid material for solid freeform fabrication is attached is removed as extra powder to obtain a solid freeform fabrication object.

It is preferable to contain an adhesive to cause the resin powder to adhere to each other. The adhesive can be dissolved in liquid to be discharged. Alternatively, the adhesive can be mixed with the resin powder as an additive particle. The adhesive is preferably dissolved in liquid to be discharged. For example, the adhesive is preferably water-soluble if the liquid to be discharged is mainly composed of water.

Examples of the water-soluble adhesive are polyvinyl alcohol (PVA), polyvinyl pyrrolidone, polyamide, polyacrylic amide, polyethylene imine, polyethylene oxides, polyacrylate resins, cellulose resins, and gelatin. These can be used alone or in combination. Of these, polyvinyl alcohol is preferable to enhance the strength and the dimension accuracy of a solid freeform fabrication object.

In addition, the attached solid freeform fabrication object may be sintered later to enhance strength.

Solid Freeform Fabrication Object

The solid freeform fabrication object can be suitably manufactured by the method of manufacturing a solid freeform fabrication object of the present disclosure using the resin powder of the first embodiment and the second embodiment of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 18 and Comparative Examples 1 to 8

Manufacturing of Resin Powder

As a thermoplastic resin, polybutylene terephthalate (PBT) resin pellet material (NOVADURAN® 5020, melting point of 218 degrees C., glass transition temperature of 43 degrees C., manufactured by Mitsubishi Engineering-Plastics Corporation) was selected.

After stirring the PBT resin pellet material at the temperature 30 degrees C. higher than the melting point of the PBT resin, the melted resin was extruded from a circular nozzle using an extruder (manufactured by The Japan Steel Works, LTD.) and drawn into a fibrous form to obtain the particle properties shown in Table 1-1. The number of filaments of fibers extruded from the nozzle was 100. The diameter of the nozzle orifice can be changed to adjust the fiber diameter. Also, the width W in the radial direction can be adjusted. At this time, it is necessary to optimize the degree of drawing of the fiber not to cut the fiber.

The produced fiber was cut using a push-cut type cutting device (NJ series 1200 type, manufactured by OGINO SEIKI CO., LTD., Ltd.) so as to have the particle form shown in Table 1-1 so that substantially cylindrical particles were obtained. At this time, it is possible to adjust the fiber feed amount at the time of cutting to adjust the length L in the axis direction of the particle. The cross section of the particle after the cutting was observed by a scanning electron microscope (S4200, manufactured by Hitachi, Ltd.) with a magnifying power of 300 times. The fiber was cleanly cut and the cross sections thereof were parallel to each other.

In Examples 8 to 10, 17 to 18, and Comparative Example 3, a fluidizing agent (AEROSIL RA200HS, manufactured by Nippon Aerosil Co., Ltd.) was added as an additive in an amount shown in Table 1-1.

Evaluation of Particle Properties

Ratio (L/W) of Length L of Particle in Axis Direction to Width W of Particle in Radial Direction and Existing Ratio of Particle Having Ratio (L/W) of Less Than 1

100 particles were observed using a scanning electron microscope (S4200, manufactured by Hitachi, Ltd.) to obtain the average of the width W of the particle in the radial direction and the average of the length L of the particle in the axis direction to calculate the ratio (L/W) and the existing ratio of the particles having a ratio (L/W) of less than 1. The measuring results are shown in Table 1-1.

Average Circularity

Using a Wet-Process Flow Type Particle Size and Form Analyzer (FPIA-3000, manufactured by Sysmex Corporation), particle form images were taken in a state where the counting number of powder particles was 1,000 or more to obtain the average circularity of the resin powder in the particle diameter range of from 0.5 to 200 μm. The circularity was measured twice for each and the average of the two was determined as the average circularity. The measuring results are shown in Table 1-1.

50 Percent Cumulative Volume Particle Diameter ($D_{50}$), Mean Volume Diameter (Mv), and Mean Number Diameter (Mn)

The 50 percent cumulative volume particle diameter ($D_{50}$) was measured by using a particle size distribution measuring instrument (microtrac MT3300EXII, manufactured by MicrotracBEL Corp.). The measuring results are shown in Table 1-1.

The mean volume diameter Mv/the mean number diameter Mn was measured and calculated by using an imaging and wet process particle size and form analyzer (flow particle image analyzer, FPIA-3000, manufactured by Sysmex Corporation). The measuring results are shown in Table 1-1.

Fabrication of Solid Freeform Fabrication Object 10 kg of powder was added to the supply bed of an SLS fabrication device (AM S5500P, manufactured by Ricoh Company, Ltd.). The setting condition of the SLS fabrication device was that the average thickness of the powder layer was 0.1 mm, the laser power was from 10 to 150 Watt, laser scanning space was 0.1 mm, and the bed temperature was set to a temperature 3 degrees C. lower than the melting point of the resin. Using the resin powder and an SLS fabrication device, (a) five tensile specimens were fabricated at the center along the longitudinal direction aligning the long side of the tensile test specimens in the direction of Y axis. The gap between each fabrication layer was 5 mm.

Next, (b) a cuboid having a side of 50 mm and an average thickness of 5 mm was manufactured. As the tensile test specimen, a multi-purpose dog-bone-like test specimen (specimen having a center portion of a length of 80 mm, a thickness of 4 mm, and a width of 10 mm) having a length of 150 mm of ISO 3167 Type 1A was used.

Evaluation of Tensile Strength Ratio

The obtained solid freeform object (tensile test specimen) was subjected to a tensile strength test according to ISO 527 regulation with a device (AGS-5 kN, manufactured by Shimadzu Corporation) to measure the tensile strength. The same grade resin pellet material was ejection-molded based on the recommended conditions of the manufacturer and subjected to the same tensile test. The tensile strength of the obtained solid freeform object was divided by the tensile strength (IM tensile strength) of the ejection-molded specimen to obtain the tensile strength ratio in percent. The test speed in the tensile strength test was constant at 50 mm/minute. The measuring results are shown in Table 1-2. In the present disclosure, the test result of the tensile strength ratio of 80 percent or more was graded as pass.

Measuring of Surface Roughness Ra of Solid Freeform Fabrication Object

The surface roughness Ra of the side surface of the obtained fabricated solid freeform fabrication object (cuboid) was measured according to ISO 1302 regulation (JIS B 0031 format). The measuring results are shown in Table 1-2. The measuring device was VR3200, manufactured by KEYENCE CORPORATION. The surface roughness Ra was determined as experimental value, which was the average of five measuring results. In addition, as the value of the surface roughness Ra decreases, the texture of the surface of the solid freeform fabrication object becomes smooth. In the present disclosure, the test result having a surface roughness Ra of 30 μm or less was graded as pass.

Comprehensive Judgment

The test results of each evaluation item of surface roughness (Ra) and tensile strength ratio were comprehensively evaluated according to the following criteria and comprehensively determined. The measuring results are shown in Table 1-2.

Evaluation Criteria

Pass: each evaluation item was Pass

Fail: at least one "fail" in each evaluation item

TABLE 1-1

| | | Particle property | | |
|---|---|---|---|---|
| | Particle form | Width W (μm) in radial direction | Length L (μm) in axis direction | Ratio (L/W) |
| Example 1 | Significantly cylindrical | 200 | 150 | 0.75 |
| Example 2 | Significantly cylindrical | 240 | 9 | 0.04 |
| Example 3 | Significantly cylindrical | 6 | 5 | 0.83 |
| Example 4 | Significantly cylindrical | 140 | 11 | 0.08 |
| Example 5 | Significantly cylindrical | 145 | 110 | 0.76 |
| Example 6 | Significantly cylindrical | 70 | 45 | 0.64 |
| Example 7 | Significantly cylindrical | 32 | 25 | 0.78 |
| Example 8 | Significantly cylindrical | 32 | 25 | 0.78 |
| Example 9 | Significantly cylindrical | 32 | 25 | 0.78 |
| Example 10 | Significantly cylindrical | 32 | 25 | 0.78 |
| Example 11 | Significantly cylindrical | 70 | 45 | 0.64 |
| Example 12 | Significantly cylindrical | 100 | 95 | 0.95 |
| Example 13 | Significantly cylindrical | 250 | 240 | 0.96 |
| Example 14 | Significantly cylindrical | 150 | 10 | 0.07 |
| Example 15 | Significantly cylindrical | 100 | 20 | 0.20 |
| Example 16 | Significantly cylindrical | 250 | 240 | 0.96 |
| Example 17 | Significantly cylindrical | 32 | 25 | 0.78 |
| Example 18 | Significantly cylindrical | 32 | 25 | 0.78 |
| Comparative Example 1 | Significantly cylindrical | 3 | 5 | 1.67 |
| Comparative Example 2 | Significantly cylindrical | 50 | 150 | 3.00 |
| Comparative Example 3 | Significantly cylindrical | 50 | 150 | 3.00 |
| Comparative Example 4 | Significantly cylindrical | 35 | 50 | 1.43 |
| Comparative Example 5 | Significantly cylindrical | 11 | 181 | 16.45 |
| Comparative Example 6 | Significantly cylindrical | 280 | 310 | 1.11 |
| Comparative Example 7 | Significantly cylindrical | 95 | 100 | 1.05 |
| Comparative Example 8 | Significantly cylindrical | 260 | 250 | 0.96 |

TABLE 1-1-continued

| | Particle property | | | | |
|---|---|---|---|---|---|
| | 50 percent cumulative volume particle size ($D_{50}$) (μm) | Mv/Mn | Average Circularity | Existing ratio of particles having L/W of less than 1 (percent by volume) | Addition of additive |
| Example 1 | 172 | 2.40 | 0.78 | 52 | — |
| Example 2 | 190 | 2.20 | 0.75 | 70 | — |
| Example 3 | 6 | 1.20 | 0.90 | 84 | — |
| Example 4 | 80 | 2.20 | 0.75 | 60 | — |
| Example 5 | 122 | 1.20 | 0.85 | 65 | — |
| Example 6 | 66 | 2.00 | 0.75 | 65 | — |
| Example 7 | 29 | 2.10 | 0.90 | 73 | — |
| Example 8 | 29 | 2.10 | 0.90 | 73 | 0.01 percent by mass |
| Example 9 | 29 | 2.10 | 0.90 | 73 | 0.05 percent by mass |
| Example 10 | 29 | 2.10 | 0.90 | 73 | 0.50 percent by mass |
| Example 11 | 59 | 2.00 | 0.92 | 73 | — |
| Example 12 | 120 | 1.30 | 0.92 | 50 | — |
| Example 13 | 250 | 1.20 | 0.90 | 55 | — |
| Example 14 | 120 | 2.40 | 0.72 | 60 | — |
| Example 15 | 62 | 1.90 | 0.81 | 70 | — |
| Example 16 | 250 | 2.50 | 0.83 | 60 | — |
| Example 17 | 29 | 2.10 | 0.90 | 73 | 3.00 percent by mass |
| Example 18 | 29 | 2.10 | 0.90 | 73 | 4.00 percent by mass |
| Comparative Example 1 | 4 | 1.20 | 0.71 | 25 | — |
| Comparative Example 2 | 80 | 2.60 | 0.70 | 25 | — |
| Comparative Example 3 | 80 | 2.60 | 0.70 | 25 | 0.50 percent by mass |
| Comparative Example 4 | 42 | 3.00 | 0.84 | 45 | — |
| Comparative Example 5 | 99 | 1.30 | 0.62 | 36 | — |
| Comparative Example 6 | 300 | 1.05 | 0.79 | 38 | — |
| Comparative Example 7 | 120 | 1.3 | 0.92 | 49 | — |
| Comparative Example 8 | 260 | 1.2 | 0.92 | 48 | — |

TABLE 1-2

| | Fabrication quality | | |
|---|---|---|---|
| | Surface roughness (Ra) (μm) | Tensile strength ratio (%) | Comprehensive Judgment |
| Example 1 | 24 | 85 | Pass |
| Example 2 | 11 | 90 | Pass |
| Example 3 | 6 | 98 | Pass |
| Example 4 | 15 | 95 | Pass |
| Example 5 | 12 | 92 | Pass |
| Example 6 | 12 | 95 | Pass |
| Example 7 | 8 | 98 | Pass |
| Example 8 | 8 | 96 | Pass |
| Example 9 | 8 | 93 | Pass |
| Example 10 | 8 | 90 | Pass |
| Example 11 | 8 | 95 | Pass |
| Example 12 | 27 | 81 | Pass |
| Example 13 | 29 | 82 | Pass |
| Example 14 | 20 | 85 | Pass |
| Example 15 | 12 | 97 | Pass |
| Example 16 | 20 | 91 | Pass |
| Example 17 | 8 | 88 | Pass |
| Example 18 | 8 | 80 | Pass |
| Comparative Example 1 | 33 | 76 | Fail |
| Comparative Example 2 | 45 | 61 | Fail |
| Comparative Example 3 | 41 | 65 | Fail |
| Comparative Example 4 | 39 | 63 | Fail |
| Comparative Example 5 | 41 | 68 | Fail |
| Comparative Example 6 | 55 | 71 | Fail |
| Comparative Example 7 | 31 | 79 | Fail |

TABLE 1-2-continued

| | Fabrication quality | | |
|---|---|---|---|
| | Surface roughness (Ra) (μm) | Tensile strength ratio (%) | Comprehensive Judgment |
| Comparative Example 8 | 33 | 77 | Fail |

Examples 19 to 34 and Comparative Examples 9 to 15

Manufacturing of Resin Powder

As a thermoplastic resin, polybutylene terephthalate (PBT) resin pellet material (NOVADURAN® 5020, melting point of 218 degrees C., glass transition temperature of 43 degrees C., manufactured by Mitsubishi Engineering-Plastics Corporation) was selected.

After stirring the PBT resin pellet material at the temperature 30 degrees C. higher than the melting point of the PBT resin, the melted resin was extruded from a circular nozzle using an extruder (manufactured by The Japan Steel Works, LTD.) and drawn in fibrous form to obtain the particle properties shown in Table 2-1. The number of fibers extruded from the nozzle was 100. The diameter of the nozzle orifice can be changed to adjust the fiber diameter. Also, the width W in the radial direction can be adjusted. At this time, it is necessary to optimize the degree of drawing of the fiber not to cut the fiber.

The produced fiber was cut using a push-cut type cutting device (NJ series 1200 type, manufactured by OGINO SEIKI CO., LTD., Ltd.) so as to have the particle form shown in Table 2-1 so that substantially cylindrical particles were obtained. At this time, it is possible to adjust the fiber feed amount at the time of cutting to adjust the length L in the axis direction of the particle. The cross section of the particle after the cutting was observed by a scanning electron microscope (S4200, manufactured by Hitachi, Ltd.) with a magnifying power of 300 times. The fiber was cleanly cut and the cross sections thereof were parallel to each other.

In Examples 28 to 30 and Comparative Example 13, a fluidizing agent (AEROSIL RA200HS, manufactured by Nippon Aerosil Co., Ltd.) was added as an additive in an amount shown in Table 2-1.

Fabrication of Solid Freeform Fabrication Object

Solid freeform fabrication objects of Examples 19 to 34 and Comparative Examples 9 to 15 were manufactured in the same manner as in Example 1 to 18 and Comparative Examples 1 to 8.

Furthermore, the manufactured significantly cylindrical particles were blended in a dry process with particles having random forms manufactured by low-temperature shattering.

Specifically, in the low-temperature shattering, the polybutylene terephthalate (PBT) resin pellet material was subjected to frost shattering at −200 degrees C. using a low-temperature system (LINREX MILL LX1, manufactured by Hosokawa Micron Corporation).

The thus-obtained randomly shaped powder was pulverized and classified to have a width of from 5 to 100 μm and classified. The 50% cumulative volume particle size was 65 μm. This randomly shaped powder was added and adjusted in such a manner to meet the existing ratio (percent by volume) of the particle having a ratio of L/W of not less than 1 shown in Table 2-1.

A double cone type mixer manufactured by DALTON CORPORATION was used for the dry mixing of the powder. The mixing time was one hour.

Evaluation on Properties of Particle

The ratio (L/W), the existing ratio of 1 or more, and the average circularity of the particles were obtained in the same manner as in Example 1 to 18 and Comparative Examples 1 to 8. The measuring results are shown in Table 2-1.

Evaluation of Tensile Strength Ratio

The thus-obtained solid freeform fabrication objects were subjected to the tensile strength test according to ISO 527 regulation using a tensile strength tester (AGS-5 kN, manufactured by Shimadzu Corporation) in the same manner as in Examples 1 to 18 and Comparative Examples 1 to 8 to evaluate the tensile strength ratio. The measuring results are shown in Table 2-2.

Measuring of Surface Roughness Ra of Solid Freeform Fabrication Object

For the side of the obtained solid freeform fabrication objects (cube), the surface roughness Ra was measured according to ISO 1302 regulation (JIS B 0031 format) in the same manner as in Examples 1 to 18 and Comparative Examples 1 to 8. The measuring results are shown in Table 2-2.

Comprehensive Judgment

The results of the comprehensive judgment made in the same manner as in Example 1 to 18 and Comparative Examples 1 to 8 were shown in Table 2-2.

TABLE 2-1

| | | Particle property | | | |
|---|---|---|---|---|---|
| | Particle form | Ratio (L/W) | Average circularity | Existing ratio of particles having L/W of less than 1 (percent by volume) | Addition of additive |
| Example 19 | Significantly cylindrical | 4.5 | 0.45 | 5 | — |
| Example 20 | Significantly cylindrical | 2.1 | 0.58 | 5 | — |
| Example 21 | Significantly cylindrical | 4.3 | 0.42 | 48 | — |
| Example 22 | Significantly cylindrical | 1.2 | 0.66 | 15 | — |
| Example 23 | Significantly cylindrical | 2.8 | 0.51 | 15 | — |
| Example 24 | Significantly cylindrical | 2.8 | 0.61 | 45 | — |
| Example 25 | Significantly cylindrical | 1.2 | 0.78 | 38 | — |

TABLE 2-1-continued

| | Particle property | | | | |
|---|---|---|---|---|---|
| | Particle form | Ratio (L/W) | Average circularity | Existing ratio of particles having L/W of less than 1 (percent by volume) | Addition of additive |
| Example 26 | Significantly cylindrical | 1.8 | 0.85 | 45 | — |
| Example 27 | Significantly cylindrical | 2.8 | 0.81 | 45 | — |
| Example 28 | Significantly cylindrical | 2.8 | 0.61 | 45 | 0.01 percent by mass |
| Example 29 | Significantly cylindrical | 2.8 | 0.61 | 45 | 0.05 percent by mass |
| Example 30 | Significantly cylindrical | 2.8 | 0.61 | 45 | 0.50 percent by mass |
| Example 31 | Significantly cylindrical | 1.0 | 0.71 | 40 | |
| Example 32 | Significantly cylindrical | 4.9 | 0.49 | 3 | |
| Example 33 | Significantly cylindrical | 4.2 | 0.39 | 49 | |
| Example 34 | Significantly cylindrical | 1.2 | 0.88 | 1 | |
| Comparative Example 9 | Significantly cylindrical | 5.5 | 0.42 | 5 | — |
| Comparative Example 10 | Significantly cylindrical | 5.5 | 0.31 | 55 | — |
| Comparative Example 11 | Significantly cylindrical | 2.1 | 0.58 | 55 | — |
| Comparative Example 12 | Significantly cylindrical | 22.0 | 0.65 | 55 | — |
| Comparative Example 13 | Significantly cylindrical | 22.0 | 0.65 | 55 | 0.50 percent by mass |
| Comparative Example 14 | Significantly cylindrical | 5.0 | 0.48 | 4 | |
| Comparative Example 15 | Significantly cylindrical | 4.3 | 0.39 | 50 | |

TABLE 2-2

| | Fabrication quality | | |
|---|---|---|---|
| | Surface roughness (Ra) (μm) | Tensile strength ratio (%) | Comprehensive Judgment |
| Example 19 | 27 | 82 | Pass |
| Example 20 | 25 | 86 | Pass |
| Example 21 | 25 | 83 | Pass |
| Example 22 | 21 | 85 | Pass |
| Example 23 | 19 | 91 | Pass |
| Example 24 | 19 | 91 | Pass |
| Example 25 | 12 | 97 | Pass |
| Example 26 | 10 | 97 | Pass |
| Example 27 | 14 | 93 | Pass |
| Example 28 | 16 | 93 | Pass |
| Example 29 | 16 | 93 | Pass |
| Example 30 | 18 | 85 | Pass |
| Example 31 | 10 | 90 | Pass |
| Example 32 | 28 | 82 | Pass |
| Example 33 | 27 | 81 | Pass |
| Example 34 | 12 | 92 | Pass |
| Comparative Example 9 | 41 | 65 | Fail |
| Comparative Example 10 | 65 | 40 | Fail |
| Comparative Example 11 | 45 | 55 | Fail |
| Comparative Example 12 | 44 | 71 | Fail |
| Comparative Example 13 | 39 | 75 | Fail |
| Comparative Example 14 | 31 | 79 | Fail |
| Comparative Example 15 | 33 | 79 | Fail |

Aspects of the present disclosure are, for example, as follows.

1. A resin powder contains a resin containing columnar particles, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

2. The resin powder according to 1 mentioned above, wherein the average of the width is 250 μm or less.

3. The resin powder according to 2 mentioned above, wherein the average of the width is 150 μm or less and the average of the length is 10 μm or more.

4. The resin powder according to 3 mentioned above, wherein the average of the width is 100 μm or less and the average of the length is 20 μm or more.

5. The resin powder according to any one of 1 to 4 mentioned above, wherein the resin powder has an average circularity of 0.75 or more.

6. The resin powder according to any one of 1 to 5 mentioned above, wherein the resin powder has a 50 percent cumulative volume particle diameter of from 5 to 250 μm and the ratio of the mean volume diameter of the resin powder to the mean number diameter of the resin powder is 2.50 or less.

7. The resin powder according to any one of 1 to 6 mentioned above, wherein the resin contains a thermoplastic resin.

8. The resin powder according to 7 mentioned above, wherein the thermoplastic resin contains at least one member selected from the group consisting of a polyolefin, a polyamide, a polyester, and a polyether.

9. The resin powder according to any one of 1 to 8 mentioned above, further contains an additive, wherein the proportion of the additive is 3.00 percent by mass or less of the resin powder.

10. The resin powder according to any one of 1 to 9 mentioned above, for solid freeform fabrication.

11. A device for manufacturing a solid freeform fabrication object includes a supply tank configured to accommodate a resin powder containing a resin comprising columnar particles, a layer forming device configured to form a layer of the resin powder and a powder attaching device configured to attach the resin powder in a selected region in the layer to each other, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

12. A method of manufacturing a solid freeform fabrication object includes forming a layer of a resin powder containing a resin containing columnar particles and melting the layer with irradiation of electromagnetic wave, cooling down the layer to cure the layer, and repeating the forming, the melting, and the cooling to laminate the layer, wherein the proportion of the columnar particles having a ratio (L/W) of less than 1 is 50 percent by volume or more in the total volume of the resin powder, where W represents the width in the radial direction of the columnar particles and L represents the length in the axis direction of the columnar particles.

13. A resin powder contains a resin containing particles containing columnar particles, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

14. The resin powder according to 13 mentioned above, wherein the proportion of the columnar particles having a proportion of from 1 to less than 5.0 is from 1 to 50 percent by volume in the total volume of the resin powder.

15. The resin powder according to 13 or 14 mentioned above, wherein the proportion of the columnar particles having a proportion of from 1 to less than 3.0 is from 10 to 50 percent by volume in the total volume of the resin powder.

16. The resin powder according to any one of 13 to 15 mentioned above, wherein the resin powder has an average circularity of 0.50 or more.

17. The resin powder according to any one of 13 to 16 mentioned above, wherein the resin contains a thermoplastic resin.

18. The resin powder according to any one of 13 to 17 mentioned above, further containing an additive, wherein the proportion of the additive is 3.00 percent by mass or less of the resin powder.

19. The resin powder according to any one of 13 to 18 mentioned above, for solid freeform fabrication.

20. A device for manufacturing a solid freeform fabrication object includes a supply tank (5) configured to accommodate a resin powder containing a resin containing particles containing columnar particles, a layer forming device configured to form a layer of the resin powder, and a powder attaching device configured to attach the resin powder in a selected region in the layer to each other, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles.

21. A method of manufacturing a solid freeform fabrication object includes forming a layer of a resin powder containing a resin containing particles containing columnar particles, melting the layer with irradiation of electromagnetic wave, cooling down the layer to cure the layer, and repeating the forming, the melting, and the cooling to laminate the layer, wherein the columnar particles have a ratio (L/W) of from 1 to less than 5.0 and the proportion of the particles having a ratio (L/W) of 1.0 or more is less than 50 percent by volume in the total volume of the resin powder where W represents the width in the radial direction of the columnar particles and L represents the length in the axis direction of the columnar particles, where W represents the width in the radial direction of the columnar particles and L represents the length in the axis direction of the columnar particles.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. A resin powder comprising:
a resin comprising columnar particles,
wherein a proportion of the columnar particles having a ratio (L/W) of less than 1 is 50 percent by volume or more in a total volume of the resin powder, where W represents a width in a radial direction of the columnar particles and L represents a length in an axis direction of the columnar particles,
wherein an average of the width is 100 μm or less and an average of the length is 20 μm or more, and wherein the resin powder has an average circularity of 0.75 or more.

2. The resin powder according to claim 1, wherein the resin powder has a 50 percent cumulative volume particle diameter of from 5 to 250 μm and a ratio of a mean volume diameter of the resin powder to a mean number diameter of the resin powder is 2.50 or less.

3. The resin powder according to claim 1, wherein the resin comprises a thermoplastic resin.

4. The resin powder according to claim 3, wherein the thermoplastic resin comprises at least one member selected from the group consisting of polyolefin, polyamide, polyester, and polyether.

5. The resin powder according to claim 1, further comprising an additive, wherein a proportion of the additive is 3.00 percent by mass or less of the resin powder.

6. The resin powder according to claim 1, for solid freeform fabrication.

7. A method of manufacturing a solid freeform fabrication object comprising:
   forming a layer of a resin powder comprising a resin comprising columnar particles;
   melting the layer with irradiation of electromagnetic wave;
   cooling down the layer to cure the layer; and
   repeating the forming, the melting, and the cooling to laminate the layer,
   wherein a proportion of the columnar particles having a ratio (L/W) of less than 1 is 50 percent by volume or more in a total volume of the resin powder, where W represents a width in a radial direction of the columnar particles and L represents a length in an axis direction of the columnar particles,
   wherein an average of the width is 100 μm or less and an average of the length is 20 μm or more, and
   wherein the resin powder has an average circularity of 0.75 or more.

* * * * *